US011436309B2

(12) United States Patent
Yarabolu

(10) Patent No.: US 11,436,309 B2
(45) Date of Patent: Sep. 6, 2022

(54) DYNAMIC KNOWLEDGE-BASED VOICE AUTHENTICATION

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 309 days.

(21) Appl. No.: 16/924,580

(22) Filed: Jul. 9, 2020

(65) Prior Publication Data

US 2022/0012316 A1   Jan. 13, 2022

(51) Int. Cl.
G06F 21/00 (2013.01)
G06F 21/32 (2013.01)
G10L 17/04 (2013.01)
G10L 17/24 (2013.01)

(52) U.S. Cl.
CPC .............. G06F 21/32 (2013.01); G10L 17/04 (2013.01); G10L 17/24 (2013.01)

(58) Field of Classification Search
CPC ......... G06F 21/32; G06F 21/62; G10L 17/04; G10L 17/24; H04L 63/0861
See application file for complete search history.

(56) References Cited

U.S. PATENT DOCUMENTS

| 5,548,647 | A | 8/1996 | Naik et al. |
| 5,893,057 | A | 4/1999 | Fujimoto et al. |
| 6,952,774 | B1 | 10/2005 | Kirovski et al. |
| 7,362,884 | B2 | 4/2008 | Willis et al. |
| 7,379,872 | B2 | 5/2008 | Cabezas et al. |
| 7,536,304 | B2 | 5/2009 | Di Mambro et al. |
| 7,657,431 | B2 | 2/2010 | Hayakawa |
| 8,014,496 | B2 | 9/2011 | Schultz |

(Continued)

OTHER PUBLICATIONS

Alex Tupman, "5 Reasons Why Voice Biometrics Is a Gam Changer," https://www.conn3ct.com/blog/five-reasons-why-voice biometrics-is-a-game-changer, © Conn3ct, trading name of Connect Managed Services (UK) Limited and G3 Comms Limited, Aug. 1, 2018, 9 pages.

(Continued)

*Primary Examiner* — Jeffrey C Pwu
*Assistant Examiner* — William A Corum, Jr.

(57) ABSTRACT

An authentication subsystem receives a request for authentication of a user to access a server. A voiceprint is determined for the user based on recordings of the user speaking. Authentication phrases is determined for the user based on the voiceprint. Based public user data and/or user transaction data, user knowledge is determined which reflects topics about which the user has knowledge. An authentication question is generated based on the authentication phrases and the user knowledge. An anticipated answer to the authentication question one of the authentication phrases. The authentication question is provided to a device operated by the user. If a response voiceprint associated with an actual spoken response to the authentication question sufficiently matches an anticipated voiceprint for an expected recording of the anticipated answer, the user is granted access to the server. Otherwise, access to the server is denied.

20 Claims, 4 Drawing Sheets

(56) References Cited

U.S. PATENT DOCUMENTS

| | | |
|---|---|---|
| 8,019,609 B2 | 9/2011 | Tamir et al. |
| 8,095,368 B2 | 1/2012 | Kumar |
| 8,139,723 B2 | 3/2012 | Fu et al. |
| 8,280,740 B2 | 10/2012 | Di Mambro et al. |
| 8,321,209 B2 | 11/2012 | Adibi |
| 8,347,370 B2 | 1/2013 | Headley |
| 8,370,152 B2 | 2/2013 | Cabezas et al. |
| 8,447,615 B2 | 5/2013 | Tamir et al. |
| 8,510,104 B2 | 8/2013 | Adibi |
| 8,543,834 B1 | 9/2013 | Barra |
| 8,571,867 B2 | 10/2013 | Di Mambro et al. |
| 8,630,391 B2 | 1/2014 | Fu et al. |
| 8,885,797 B2 | 11/2014 | Schultz |
| 8,886,544 B2 | 11/2014 | Kumar |
| 8,959,360 B1 | 2/2015 | Barra |
| 9,118,669 B2 | 8/2015 | Moganti et al. |
| 9,262,612 B2 | 2/2016 | Cheyer |
| 9,424,837 B2 | 8/2016 | Talhami et al. |
| 9,444,816 B2 | 9/2016 | Johnsgard et al. |
| 9,491,167 B2 | 11/2016 | Talhami et al. |
| 9,620,127 B2 | 4/2017 | Kumar |
| 9,799,338 B2 | 10/2017 | Grover |
| 9,898,723 B2 | 2/2018 | Rutherford et al. |
| 10,102,359 B2 | 10/2018 | Cheyer |
| 10,140,992 B2 | 11/2018 | Kumar |
| 10,200,364 B1* | 2/2019 | Ketharaju ........... H04L 63/0853 |
| 10,417,405 B2 | 9/2019 | Cheyer |
| 2007/0219792 A1* | 9/2007 | Normandin ............. G10L 17/24 704/E15.045 |
| 2008/0256613 A1 | 10/2008 | Grover |
| 2013/0218571 A1 | 8/2013 | Tamir et al. |
| 2014/0359736 A1* | 12/2014 | Harty ................... H04L 63/0861 726/7 |
| 2014/0359739 A1* | 12/2014 | Bao .......................... G06F 21/46 726/7 |
| 2016/0065558 A1* | 3/2016 | Suresh .................... G06F 21/32 726/7 |
| 2016/0365095 A1* | 12/2016 | Lou ........................ G10L 17/04 |
| 2018/0047397 A1 | 2/2018 | Grover |
| 2018/0113675 A1 | 4/2018 | Rutherford |
| 2019/0050545 A1* | 2/2019 | Keret ..................... G10L 17/24 |

OTHER PUBLICATIONS

"Confirm someone's identity before you complete the transaction," https://www.microbilt.com/product/id-authenticate?utm_term=authentication%20tool&utm_source=adwords&utm_campaign=Alex++Microbilt&utm_medium=ppc&hsa_acc=7530602606&hsa_cam=9761705194&hsa_ad=428705563828&hsa_grp=103677076710&hsa_mt=b&hsa_kw=authentication%20tool&hsa_net=adwords&hsa_src=g&hsa_tgt=kwd-365211342605&hsa_ver=3&gclid=EAIaIQobChMI4qD_mbj16QIV1CCtBh1RQQWEEAMYASAAEgJnhvD_BwE, © MicroBilt Corporation, 2020, 3 pages.

* cited by examiner

DYNAMIC KNOWLEDGE-BASED VOICE AUTHENTICATION

TECHNICAL FIELD

The present disclosure relates generally to user authentication technology. More particularly, in certain embodiments, the present disclosure is related to dynamic knowledge-based voice authentication.

BACKGROUND

User authentication may be requested before a user is granted access to secure information and/or services. The purpose of user authentication is to determine that the user is an authorized individual who should be granted access to the secure information and/or services. For example, a user may be requested to provide a username and password to access a secure service, such as a service used to review and update personal information.

SUMMARY

In an embodiment, a system includes a database which stores voice recordings of users speaking. The database stores one or both of public user data which includes publicly available information about the users and user transaction data which includes information about transactions performed by the users. The system includes an authentication subsystem coupled to the database. The authentication subsystem receives a request for authentication of a user to access a secure server. A voiceprint is determined for the user based on the stored voice recordings of the user speaking. The voiceprint includes a frequency-based representation of speech by the user. A set of authentication phrases is determined for the user based on the voiceprint. The authentication phrases may be phrases which includes sounds which facilitate the identification of the user from other users. Based on one or both of the public user data and the user transaction data, user knowledge is determined. The user knowledge includes information about one or more topics about which the user has knowledge. An authentication question is generated or determined based on the set of authentication phrases and the user knowledge. An anticipated answer to the authentication question is associated with the one or more topics about which the user has knowledge and is a first authenticated phrase of the determined set of authentication phrases. An anticipated voiceprint corresponding to an expected voiceprint for the user speaking the first authentication phrase is determined based on the voiceprint of the user and the first authentication phrase. The authentication question is provided to a device operated by the user. A response voiceprint is determined or received that is associated with a recording of a response to the authentication question spoken by the user. In response to determining that the response voiceprint sufficiently matches the anticipated voiceprint, the user is granted access to the secure server. Otherwise, in response to determining that the response voiceprint does not sufficiently match the anticipated voiceprint, the user is denied access to the secure server.

Previous technology used for user authentication suffers from several disadvantages. For instance, technologies involving multi-factor identification, where a secondary code is sent to a user's mobile device and the code is required for authentication, may become problematic if a user changes phone numbers or does not own a device that is capable of receiving the two-factor authentication code. In some cases, a user may provide answers to one or more predefined, or static, authentication questions, and these unchanging, or static questions are used for supplemental authentication of user identity. Such static authentication questions are susceptible to compromise and may result in considerable decreases in ease-of-use, for example, if the user forgets an answer to one of the predefined question (e.g., because the answer may have been supplied a long time ago when an account was first created). In addition to these problems, this disclosure also encompasses the recognition that the user-defined answer to a static authentication question may not be well suited for reliable voice authentication. Authentication techniques which rely on voice recognition alone may be susceptible to mimicry, for example, using so-called deepfake technology to create deepfakes (i.e., artificial voice recordings that mimic the voice of a particular individual). Improved technology is needed in response to the increased prevalence of deepfakes.

Certain embodiments of this disclosure provide unique solutions to technical problems of previous authentication technology, including those problems identified above. For example, the disclosed authentication system provides several technical advantages, which include: 1) the identification of an improved authentication phrase that is a reliable identifier of the user and that may also be less susceptible to mimicry using deepfake technology; 2) the identification of a dynamic authentication question which is within the dynamically determined knowledge of the user and which prompts the user to speak the improved authentication phrase; and 3) the facilitation of efficient user authentication in a more user-friendly and secure manner than was possible using either static authentication questions or conventional voice-based authentication. As such, this disclosure may improve the function of computer systems used for user authentication. For example, the system described in this disclosure may monitor various user-specific data sources, which may include indicators of user knowledge (e.g., from social media posts, from information about transactions by the user, and the like) and indicators of how the user speaks (e.g., from recordings of the user speaking), and use this information to determine dynamic authentication questions for use in voice authentication. The systems described in this disclosure may particularly be integrated into a practical application of an authentication system, which uses various user-specific data associated with the user's knowledge and the sound of the user's voice to provide a user-specific authentication question which is designed to prompt the user to speak a specially selected authentication phrase. The specially selected authentication phrase includes speech sounds that may more reliably identify the user and/or may be difficult to authentically replicate using deepfake technology.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
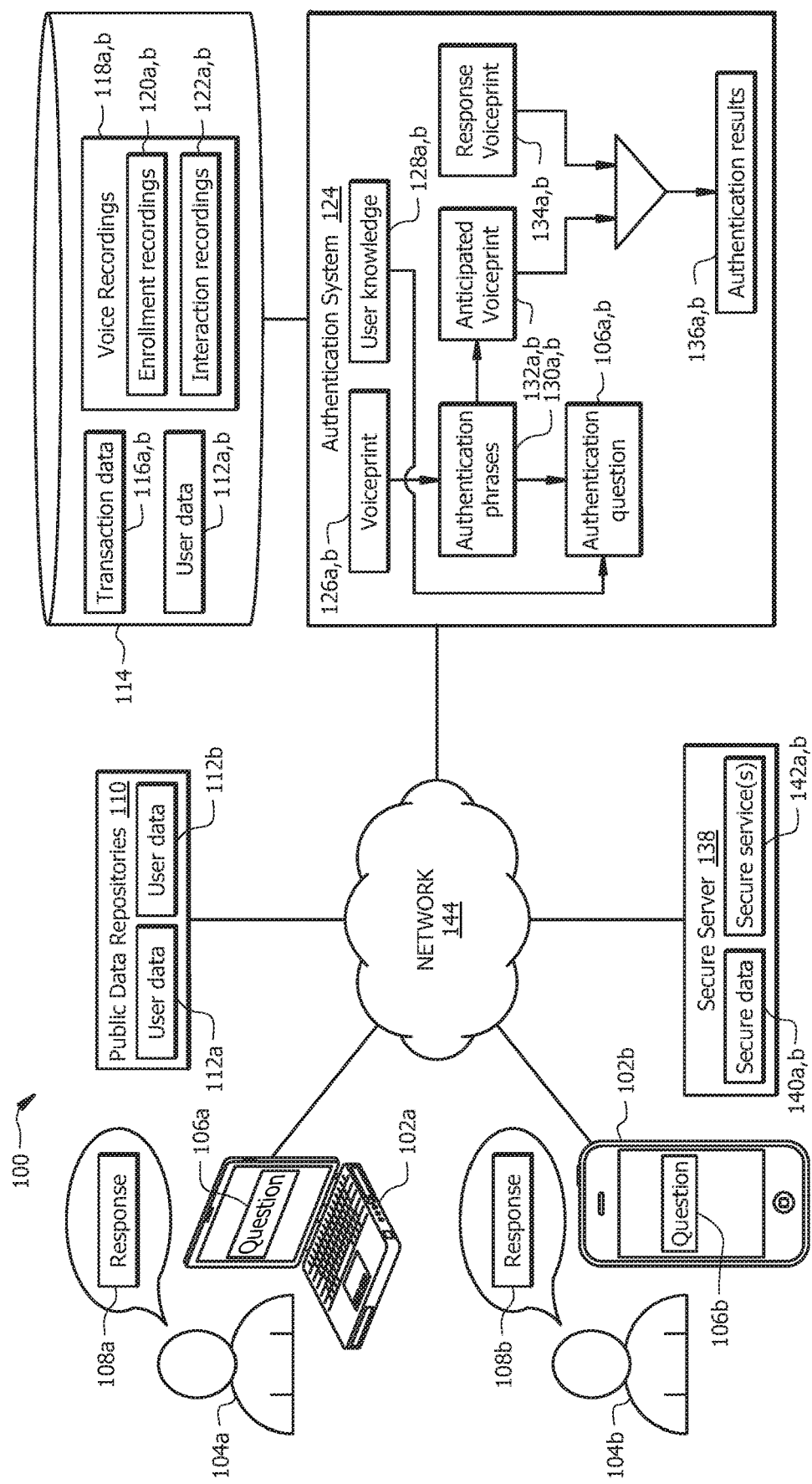
FIG. 1 is a schematic diagram of an example system for user authentication.
Figure 2:
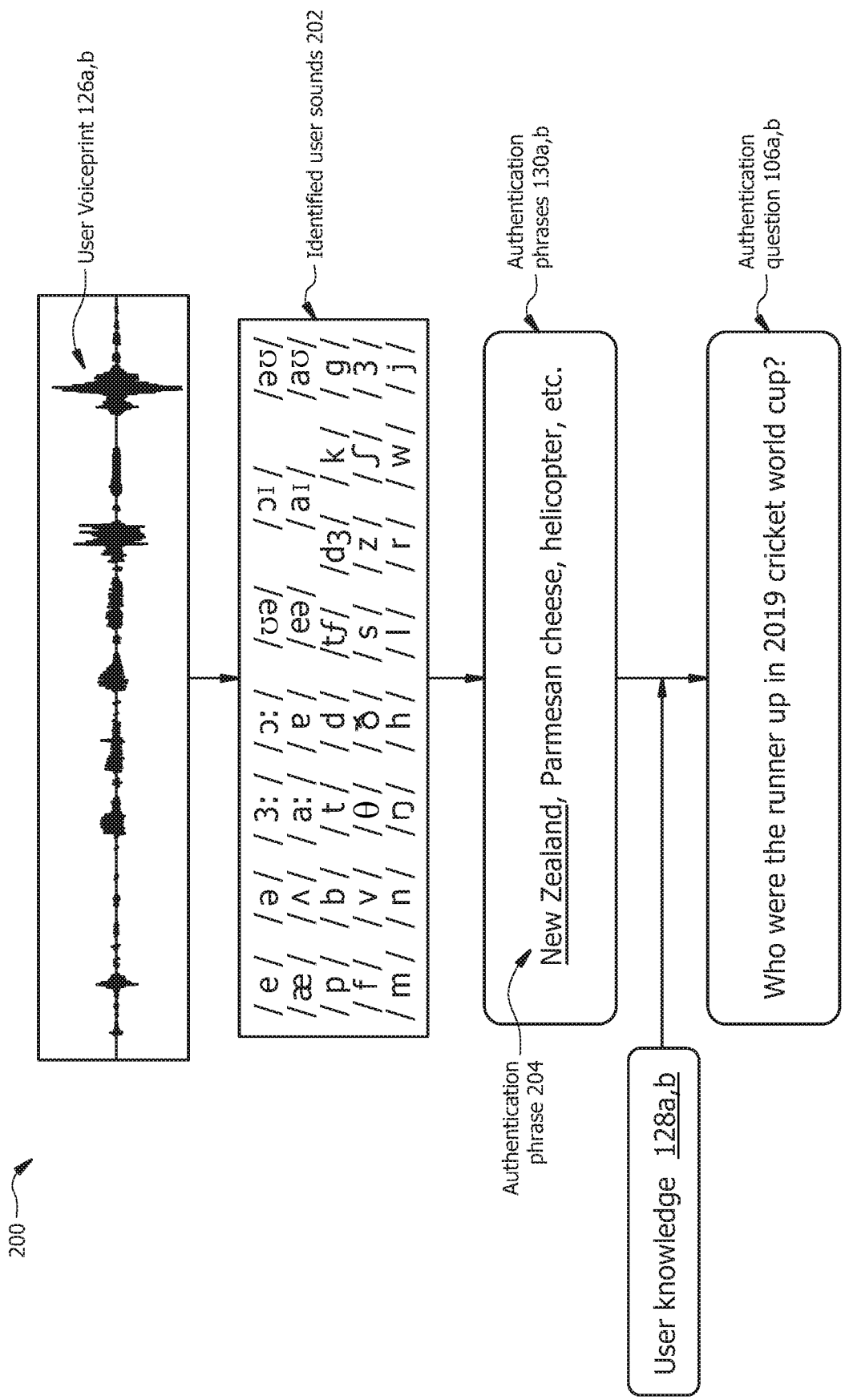
FIG. 2 is a flow diagram illustrating example determination of an authentication phrase and authentication question using the system illustrated in FIG. 1.
Figure 3:
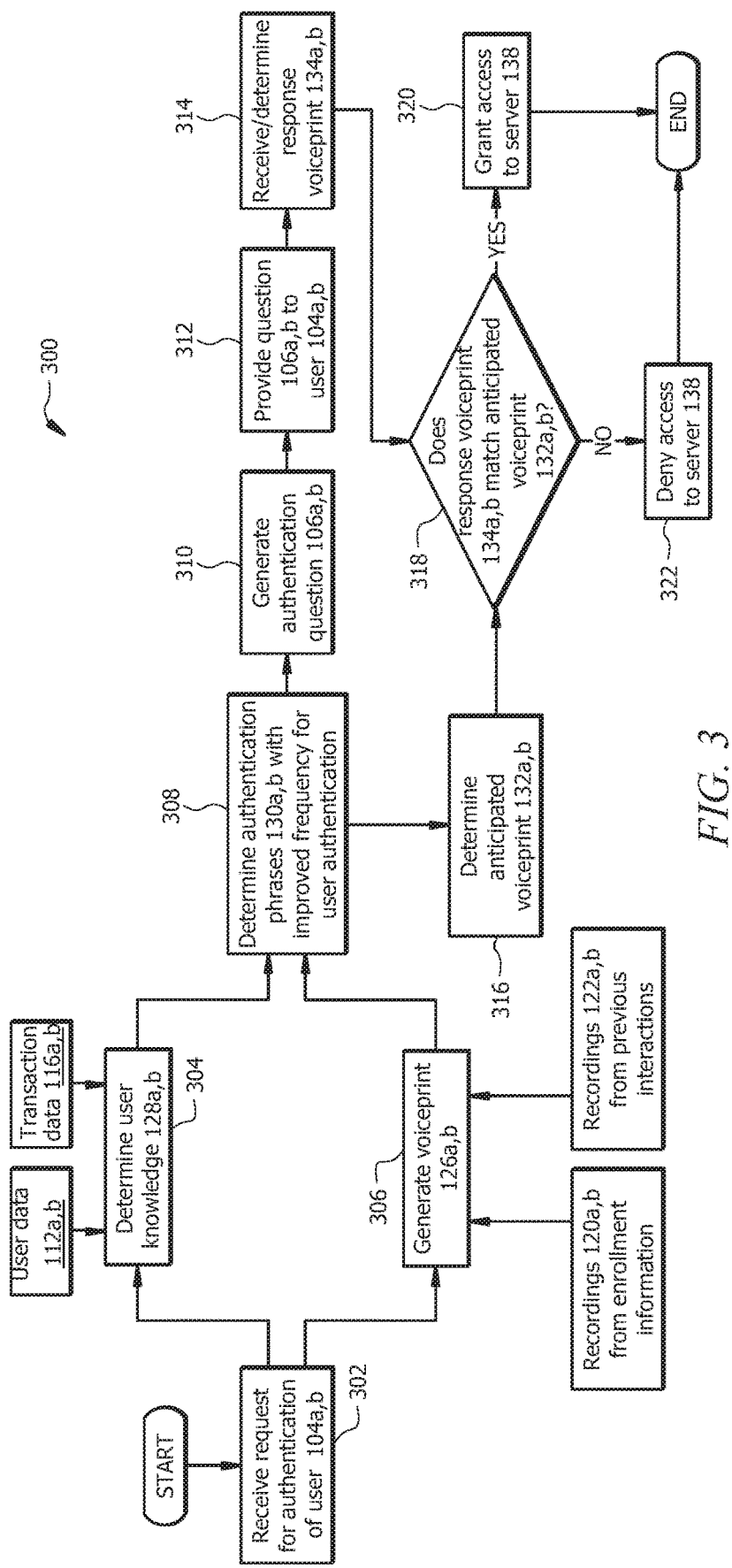
FIG. 3 is a flow diagram illustrating an example operation of the system illustrated in FIG. 1.
Figure 4:
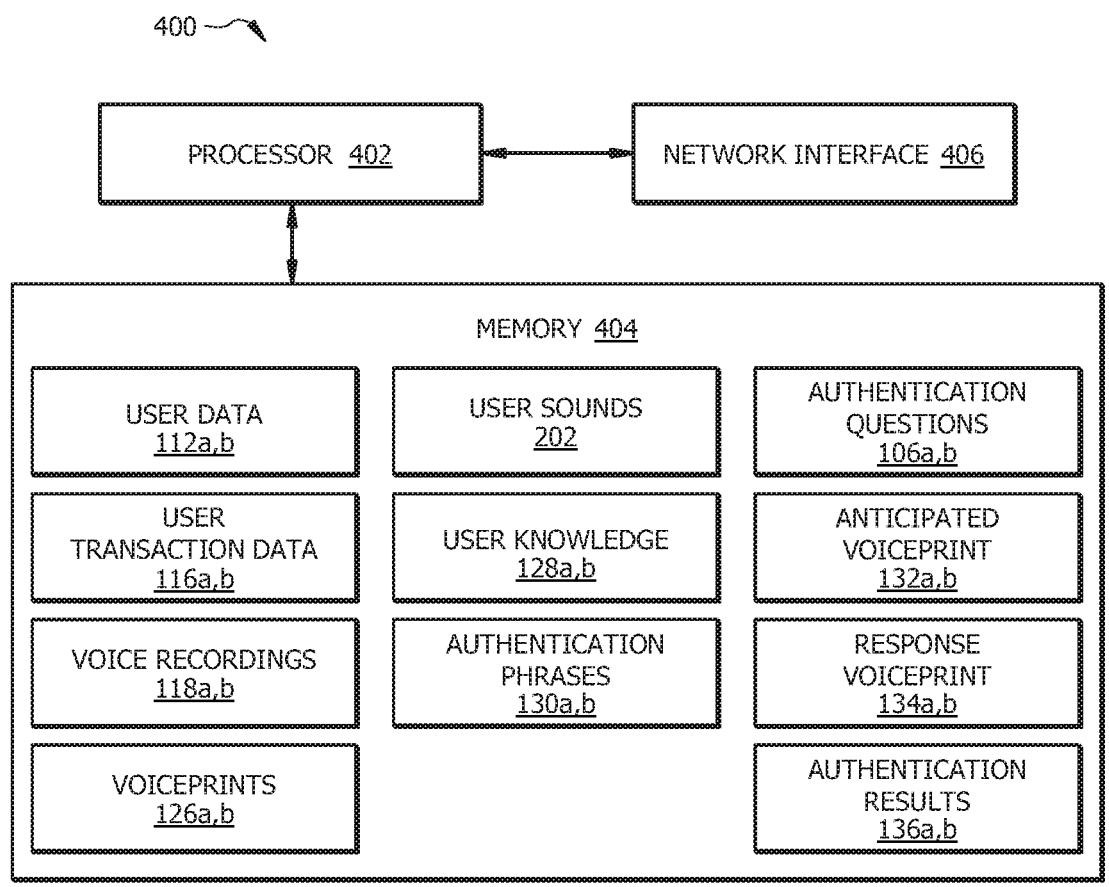
FIG. 4 is a diagram of an example device configured to implement at least some of the components of the system of FIG. 1.

As described above, previous voice authentication technology has several disadvantages. For instance, previous technology was susceptible to compromise using deepfake technology to mimic a user's voice when speaking a phrase. For example, if a user is presented with a phrase to speak or is asked to speak his/her name, the previous voice authentication technology may be compromised by mimicking the user's voice. In some cases, previous technology might not be able to efficiently identify or authenticate a user based on his/her voice alone, resulting in usability and reliability issues. Moreover, the use of static predefined question and answer combinations (e.g., the provision of answers to predefined questions, such as a maiden name or the like) may be susceptible to compromise by bad actors. Even if the answers to static questions are not compromised, the answers to these questions may not be well-suited for voice authentication. For example, the frequency characteristics of the answers, when spoken, may not include features that facilitate reliable user authentication. This disclosure encompasses not only the recognition of these various problems of previous technology but also provides solutions based on the dynamic authentication system described below. FIG. 1 illustrates an example of this authentication system. FIG. 2 illustrates the determination of an authentication phrase and a corresponding authentication question that is within the knowledge of a user. FIG. 3 illustrates a method for operating the authentication system. FIG. 4 illustrates a device which may be used to implement the system of FIG. 1.

User Authentication System

FIG. 1 is a schematic diagram of an example system 100 for the authentication of users 104a,b to access a secure server 138. The system 100 includes user devices 102a,b, public data repositories 110, a database 114, a dynamic authentication subsystem 124, and a secure server 138, and a network 144. As described in greater detail below with respect to FIGS. 2-3, the dynamic authentication subsystem 124 described in this disclosure may first identify a set of authentication phrases 130a,b which may best (e.g., with increased reliably and/or with decreased chance of mimicry) identify a user 104a,b based on the user's voice. The dynamic authentication subsystem 124 determines an authentication question 106a,b that is within the anticipated knowledge 128a,b of the user 104a,b (e.g., based on public user data 112a,b and/or transaction data 116a,b for the user 104a,b) and that prompts the user 104a,b to speak one of the authentication phrases 130a,b aloud as a response 108a,b. If a voiceprint 134a,b for the spoken response 108a,b matches the anticipated voiceprint 132a,b for the authentication phrase 130a,b, then the authentication results 136a,b indicate that the user 104a,b should be granted access to the secure server 138.

The user devices 102a,b are generally any computing devices operable to present an authentication questions 106a,b to a user 104a,b and record a spoken response 108a,b to the question 106a,b. As such, a user device generally includes a user interface operable to display the authentication question 106a,b and/or a speaker operable to play an audible version of the authentication question 106a,b. The user devices 102a,b also include a recording device, such as a microphone, operable to record the spoken response 108a,b. The recording of the response 108a,b may be provided to the dynamic authentication subsystem 124. In some cases, the recording may be at least partially preprocessed prior to providing the response 108a,b to the dynamic authentication subsystem 124. For example, the user device 102a,b may determine the response voiceprint 134a,b for the recorded response 108a,b (e.g., using frequency spectrum analysis as described further with respect to the dynamic authentication system 124 below), and the response voiceprint 134a,b may be provided to the dynamic authentication system 124. While the example system 100 of FIG. 1 shows two user devices 102a,b, it should be understood that the system 100 may include any number of user devices 102a,b. Each user device 102a,b may be implemented using the processor, memory, and interface of the device 400 described below with respect to FIG. 4.

The public data repositories 110 generally include any repositories of publicly available user data 112a,b for users 104a,b. The public data repositories 110 may include information from social media profiles of the users 104a,b and/or any other profiles of the users 104a,b that include publicly available data 112a,b. The publicly available data 112a,b may include information about events which the users 104a,b have attended, such as public events, social gatherings, actions the users 104a,b have taken (e.g., traveling to particular locations, cooking certain dishes, playing a certain game, etc.), events about which the users 104a,b have knowledge (e.g., sporting events, artistic performances, performing artists, etc.), and any other topics about which the users 104a,b have knowledge (e.g., media, such as music, movies, news, etc. the users 104a,b have commented about on a social media platform). As described further below, the dynamic authentication subsystem 124 generally uses the publicly available user data 112a,b to determine the user knowledge 128a,b for each user 104a,b. The user knowledge 128a,b generally corresponds to topics about which the user 104a,b has knowledge. For instance, if the publicly available user data 112a,b for a given user 104a,b indicates that the user 104a,b is knowledgeable about a given event attended or observed by the user 104a,b, action taken by the user 104a,b, and/or any other topic(s), then the user knowledge 128a,b may include information about the event, action, and/or other topic(s). For instance, user knowledge 128a,b may include information about a sporting event, performance, political personality, media event, historical event, a location, or the like. The public data repositories 110 may be implemented using the processor, memory, and interface of the device 400 described below with respect to FIG. 4.

The database 114 is generally any database (i.e., including hardware and/or software) operable to store information used by the dynamic authentication subsystem 124. The database 114 stores transaction data 116a,b and voice recordings 118a,b of the corresponding users 104a,b. In some embodiments, the publicly available data 112a,b (or a portion of this data 112a,b) may be stored in the database 114. The transaction data 116a,b includes information about transactions performed by the users 104a,b. In some cases, the entity operating the dynamic authentication subsystem 124 and providing the secure server 138 might uniquely have records of and access to this transaction data 116a,b.

For example, transaction data 116a,b may include the price a user 104a,b paid for an item purchased on a certain date at a certain location, a location of a bank branch and/or ATM at which a corresponding user 104a,b made a transaction, an amount of money transferred in such a transaction, and the like. If the transaction data 116a,b for a user 104a,b indicates the user 104a,b took part in a given transaction, then the user knowledge 128a,b may include characteristics of the transaction such as, for example, an amount of money transferred in the transaction, items associated with (e.g., obtained during) the transaction, location of the transaction, and/or the like.

The voice recordings 118a,b may include enrollment recordings 120a,b (e.g., recordings of the voices of the users 104a,b) obtained at the time the users 104a,b enrolled with a service provided by the secure server 138 (e.g., a secure service 142a,b) and interaction recordings 122a,b obtained while the user 104a,b interacted with the entity operating the dynamic authentication subsystem 124 and/or the secure server 138. For example, each interaction recording 122a,b may include recordings of the corresponding user 104a,b speaking during a previous transaction. As described further below, the voice recordings 118a,b are generally used by the dynamic authentication subsystem 124 to determine the voiceprints 126a,b. The database 114 may be implemented using the processor, memory, and interface of the device 400 described below with respect to FIG. 4.

The dynamic authentication subsystem 124 is a device or collection of devices operable to receive information from the public data repositories 110 and/or the database 114 and use this information to facilitate improved authentication of the users 104a,b. The dynamic authentication subsystem 124 may be implemented using the processor, memory, and interface of the device 400 described below with respect to FIG. 4. As described in greater detail with respect to FIGS. 2 and 3 below, the dynamic authentication subsystem 124 determines, based on the stored voice recordings 118a,b, a voiceprint 126a,b each user 104a,b. The voiceprint 126a,b is generally a visual record or frequency and/or amplitude-based representation of speech. A voiceprint 126a,b for a user 104a,b may be determined from a frequency spectrum analysis of the voice recordings 118a,b for that user 104a,b. An example voiceprint 126a,b is illustrated in FIG. 2, described below.

The dynamic authentication subsystem 124 also determines user knowledge 128a,b for each user 104a,b. The user knowledge 128a,b generally includes information about which the corresponding user 104a,b should have knowledge based on the publicly available user data 112a,b and/or the transaction data 116a,b for the user 104a,b. For example, if the publicly available user data 112a,b for a given user 104a,b indicates the user is knowledgeable about a given topic (e.g., an event, action, location, etc.), then the user knowledge 128a,b may include information about that topic. Similarly if the transaction data 116a,b for a user 104a,b indicates the user 104a,b took part in a given transaction, then the user knowledge 128a,b may include characteristics of the transaction such as, for example, an amount of money transferred in the transaction, any item(s) associated with (e.g., obtained during) the transaction, a location of the transaction, and/or the like.

The dynamic authentication subsystem 124 uses the voiceprint 126a,b to determine authentication phrases 130a,b for each user 104a,b. The authentication phrases 130a,b are generally phrases (e.g., one or more words) that facilitate the identification of the users 104a,b based on characteristics of the user's voices when these phrases 130a,b are spoken. For example, the authentication phrases 130a,b may include one or more sound types which facilitate the distinction of one user 104a from another user 104b (e.g., based on voiceprint comparison and/or frequency spectrum analysis—see FIG. 2 and corresponding description below). The dynamic authentication subsystem 124 then generates an authentication question 106a,b for each user 104a,b based on the authentication phrases 130a,b and the user knowledge 128a,b. For example, the dynamic authentication subsystem 124 may match the user knowledge 128a,b to predefined questions to which an answer is one of the authentication phrases 130a,b. In general, an anticipated answer to the authentication question 106a,b is one of the authenticated phrases 130a,b. The example determination of the authentication phrases 130a,b and authentication questions 106a,b is described in greater detail below with respect to FIG. 2.

The dynamic authentication subsystem 124 determines an anticipated voiceprint 132a,b at least for an authentication phrase 130a,b which is the anticipated answer to the authentication question 106a,b presented to a user 104a,b. The anticipated voiceprint 132a,b is a voiceprint expected to be obtained from a recording of the user 104a,b speaking the authentication phrase 130a,b that is the anticipated answer to the authentication question 106a,b. The anticipated voiceprint 132a,b may be determined from a previous recording (e.g., from voice recordings 118a,b) of the user 104a,b speaking the authentication phrase 130a,b. In some cases, such a recording may not be available. The anticipated voiceprint 132a,b may be determined based on a frequency spectrum analysis of the user's overall voiceprint 126a,b, as described further with respect to FIG. 2 below.

The dynamic authentication subsystem 124 determines or receives a response voiceprint 134a,b which is a voiceprint for the spoken response 108a,b to the authentication question 106a,b from the user 104a,b. The dynamic authentication subsystem 124 compares the anticipated voiceprint 132a,b to the response voiceprint 134a,b to determine authentication results 136a,b. The authentication results 136a,b generally correspond to whether or not the user 104a,b should be granted access to the secure server 138. Generally, if the response voiceprint 134a,b matches the anticipated voiceprint 132a,b (e.g., if characteristic frequencies of an acoustic frequency spectrum of the anticipated voiceprint 132a,b are within a threshold range of those of the response voiceprint 134a,b), the user 104a,b is granted access to the secure server 138. However, if the response voiceprint 134a,b does not match the anticipated voiceprint 132a,b, the user 104a,b is granted access to the secure server 138.

The secure server 138 is generally a server of any type (e.g., a physical server or virtual server) operable to store secure data 140a,b and/or provide access to secure services 142a,b for the users 104a,b. The secure data 140a,b may be data which should only be viewed or accessed by the corresponding user 104a,b. For example, the secure data 140a,b may include personal information for the user 104a,b, private financial information for the user 104a,b, and/or the like. A secure service 142a,b may be an application which may be employed to review secure data 140a,b or to which access is otherwise restricted. The secure server 138 may be implemented using the processor, memory, and interface of the device 400 described below with respect to FIG. 4.

Network 144 facilitates communication between and amongst the various components of the system 100. This disclosure contemplates network 144 being any suitable network operable to facilitate communication between the components of the system 100. Network 144 may include any interconnecting system capable of transmitting audio, video, signals, data, messages, or any combination of the preceding. Network 144 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of the system 100, a user 104a,b requests to access the secure server 138 to view secure data 140a,b and/or use secure service 142a,b. In response to this request, a request to authenticate the user 104a,b is provided to the dynamic authentication subsystem 124. The dynamic authentication subsystem 124 determines or accesses a voiceprint 126a,b for the user 104a,b to determine authentication phrases 130a,b useful for authenticating the identity of the user 104a,b based on characteristics of the user's voice. The dynamic authentication subsystem 124 determines the user knowledge 128a,b based on the user's publicly available user data 112a,b and/or the user's transaction data 116a,b. The user knowledge 128a,b is used to generate an authentication question 106a,b for the user 104a,b. An anticipated answer to the generated authentication question 106a,b is one of the authentication phrases 130a,b for the user 104a,b. In some cases, the dynamic authentication subsystem 124 may have previously determined the voiceprint 126a,b and authentication phrases 130a,b for the user 104a,b. The user knowledge 128a,b and associated authentication question 106a,b may be updated intermittently or dynamically for each authentication attempt. For example, the authentication phrases 128a,b may be determined and/or updated intermittently for each user 104a,b, and a new authentication question 106a,b may be determined for each authentication request (e.g., based on recent publicly available user data 112a,b and/or transaction data 116a,b).

FIG. 2 illustrates an example determination of an authentication question 106a,b from the user voiceprint 126a,b and user knowledge 128a,b for a user 104a,b. In this example, the dynamic authentication subsystem 124 identifies the different sounds 202 for the user's voice for a number of different sound types (i.e., for the different sounds corresponding to the phonetic symbols illustrated in FIG. 2). The different sounds 202 identified from the user's speech (i.e., from the user's voiceprint 126a,b) are used to determine the set of authentication phrases 130a,b which should facilitate reliable identification of the user 104a,b. For example, the sounds 202 for certain sound types (or a combination of sounds 202 of certain types) may be identified as particularly unique candidate sounds 202 for identifying the user 104a,b, and the authentication phrases 130a,b may be selected because they include at least one of these candidate sounds 202 (or combinations of sounds 202). Thus, the authentication phrases 130a,b may facilitate more reliable identification of the user 104a,b than would be expected for voice authentication/identification based on a randomly selected phrase or a phrase selected by the user 104a,b at the time of enrollment.

Still referring to FIG. 2, the dynamic authentication subsystem 124 then uses the set of authentication phrases 130a,b and the user knowledge 128a,b to determine an authentication question 106a,b. In the example of FIG. 2, the authentication question 106a,b reflects the user's knowledge of a particular sporting event. The user knowledge 128a,b used to generate this authentication question 106a,b may have been based on a social media post about this particular sporting event and/or transaction information indicating the user 104a,b attended or otherwise observed this sporting event (e.g., transaction data 116a,b for the user 104a,b may indicate that the user 104a,b purchased an item at the event or purchased a ticket to the event, such that the information required to answer the authentication question 106a,b is likely within the user knowledge 128a,b of the user 104a,b). The anticipated answer (i.e., the correct answer) to the authentication question 106a,b is a particular phrase 204 of the set of authentication phrases 130a,b. Thus, the authentication question 106a,b is not only customized to the user knowledge 128a,b of the user 104a,b but may also cause an authentication phrase 204 that has been specially selected to reliably identify/authenticate the particular user 104a,b based on properties of his/her voice.

Returning to FIG. 1, the authentication question 106a,b is presented to the user 104a,b (e.g., on a display or via an audio device of the user device 102a,b), and the user 104a,b provides a spoken response 108a,b. A response voiceprint 134a,b for the spoken response 108a,b is received or determined by the dynamic authentication subsystem 124. This response voiceprint 134a,b is compared to the anticipated voiceprint 132a,b. If the response voiceprint 134a,b matches the anticipated voiceprint 132a,b (e.g., if measurable characteristics of the frequency spectrum of the anticipated voiceprint 132a,b is within a threshold range of those of the response voiceprint 134a,b), the user 104a,b is granted access to the secure server 138. For example, a statistical method may be employed to compare the frequency and amplitude characteristics of the voiceprints 132a,b and 134a,b and determine an extent to which the voiceprints 132a,b and 134a,b overlap or match. If the response voiceprint 134a,b does not match the anticipated voiceprint 132a,b, the user 104a,b is granted access to the secure server 138.

Example Method of Dynamic Knowledge-Based Voice Authentication

FIG. 3 is a flow diagram illustrating an example operation of the system 100 of FIG. 1 for voice-based authentication of users 104a,b to access the secure server 138. As described above with respect to FIGS. 1 and 2, the dynamic authentication subsystem 124 facilitates more secure and user-friendly authentication than was possible using previous technology by presenting an authentication question 106a,b to a user 104a,b that is based on a dynamic determination of the user's knowledge 128a,b. The anticipated answer (i.e., the correct answer) to the authentication question 106a,b is an authentication phrase 130a,b that is specially selected to reliably distinguish the user 104a,b based on characteristics of his/her voice. The method 300 may begin at step 302 where the dynamic authentication subsystem 124 receives a request to authenticate a user 104a,b. The authentication request may be received from a user 104a,b and/or from the secure server 138 which the user 104a,b is attempting to access.

At step 304, the dynamic authentication subsystem 124 determines the user knowledge 128a,b. As described above, the user knowledge 128a,b generally includes information about which the user 104a,b should have knowledge based on the publicly available user data 112a,b and/or the transaction data 116a,b for the user 104a,b. For example, if the publicly available user data 112a,b for a given user 104a,b indicates the user is knowledgeable about a given topic (e.g., event, action, location, etc.), then the user knowledge 128a,b may include information about that topic. Similarly if the transaction data 116a,b for a user 104a,b indicates the user 104a,b took part in a given transaction, then the user knowledge 128a,b may include characteristics of the transaction such as, for example, an amount of money transferred in the transaction, an items associated with (e.g., obtained during) the transaction, a location of the transaction, and/or the like.

At step 306, the dynamic authentication subsystem 124 determines the voiceprint 126a,b for the user 104a,b. The voiceprint 126a,b is generally a visual record or frequency and/or amplitude-based representation of speech by the user 104a,b. A voiceprint 126a,b for a user 104a,b may be determined from a frequency spectrum analysis of the voice recordings 118a,b for that user 104a,b. The dynamic authentication subsystem 124 may determine a voiceprint 126a,b using any method to obtain an acoustic frequency spectrum of a voice or other frequency-based representation of the voice. An example voiceprint 126a,b is illustrated in FIG. 2, described above.

At step 308, the dynamic authentication subsystem 124 determines the set of authentication phrases 130a,b which facilitate improved identification and/or authentication of the user 104a,b based on his/her voiceprint 126a,b. For example, the authentication phrases 130a,b may include one or more sounds of sound types which facilitate the distinction of one user 104a from another user 104b (e.g., based on voice comparison and/or frequency spectrum analysis). The determination of example authentication phrases 130a,b is described with respect to FIG. 2 above.

At step 310, the dynamic authentication subsystem 124 generates an authentication question 106a,b for the user 104a,b based on the authentication phrases 130a,b and the user knowledge 128a,b. For example, the dynamic authentication subsystem 124 may match the user knowledge 128a,b to predefined questions to which an answer is one of the authentication phrases 130a,b. In general, an anticipated answer to the authentication question 106a,b is one of the authenticated phrases 130a,b, as described above with respect to the example of FIG. 2.

At step 312, the dynamic authentication subsystem 124 provides the authentication question 106a,b to the user 104a,b. For example, the authentication question 106a,b may be transmitted (e.g., via network 144) to the device 102a,b of the user 104a,b and presented on a display of the device 102a,b or played using an audio device of the device 102a,b. At step 314, the dynamic authentication subsystem 124 determines or receives a response voiceprint 134a,b for the response 108a,b spoken aloud by the user 104a,b to the authentication question 106a,b. The response voiceprint 134a,b may be determined based on a recording of the spoken response 108a,b using any appropriate method of acoustic frequency spectrum analysis.

At step 316, the dynamic authentication subsystem 124 determines the anticipated voiceprint 132a,b for the authentication phrase 130a,b that corresponds to the anticipated answer to the authentication question 106a,b that was provide to the user 104a,b at step 312. The anticipated voiceprint 132a,b is generally the voiceprint which is expected to result from a frequency spectrum analysis of a recording of the user 104a,b speaking the authentication phrase 130a,b. For example, the anticipated voiceprint 132a,b may be generated by identifying the sound types included in the authentication phrase 130a,b and an order in which the identified sound types are included in the authentication phrase, generating an anticipated sound combination by combining sounds determined for each sound type in the determined order, and performing frequency analysis on the anticipated sound combination to determine the anticipated voiceprint 132a,b for the authentication phrase 130a,b (see FIG. 2 and corresponding description of sounds 202 of different sound types above).

At step 318, the dynamic authentication subsystem 124 determines whether the response voiceprint 134a,b from step 314 matches the anticipated voiceprint 132a,b from step 316. For example, the acoustic frequency spectrum of the response voiceprint 134a,b may be compared to the acoustic frequency spectrum of the anticipated voiceprint 132a,b. For example, the frequency and amplitude of spectral features (e.g., local maxima) in the acoustic frequency spectra of the voiceprints 132a,b and 134a,b may be compared. If these features are within a threshold range of each other, then the dynamic authentication subsystem 124 determines that the response voiceprint 134a,b matches the anticipated voiceprint 132a,b. Otherwise, if these features are not within a threshold range of each other, then the dynamic authentication subsystem 124 determines that the response voiceprint 134a,b does not match the anticipated voiceprint 132a,b. Generally, any appropriate method of comparing frequency spectra may be employed to compare the voiceprints 132a,b and 134a,b (e.g., to determine an extent to which the voiceprints 132a,b and 134a,b match or overlap). If the response voiceprint 134a,b matches the anticipated voiceprint 132a,b, the dynamic authentication subsystem 124 grants the user 104a,b access to the secure server 138 at step 322. Otherwise, if the response voiceprint 134a,b does not match the anticipated voiceprint 132a,b, the dynamic authentication subsystem 124 denies the user 104a,b access to the secure server 138 at step 324.

Example Device for User Authentication

FIG. 4 is an embodiment of a device 400 which may be used to implement various components of the system 100 illustrated in FIG. 1. For example, each of the public data repositories 110, the database 114, the dynamic authentication subsystem 124, and the secure server 138 of FIG. 1 may be implemented using a corresponding device 400 or a corresponding collection of devices 400. As another example, a device 400 may be used to implement a corresponding user device 102a,b. The device 400 includes a processor 402, a memory 404, and a network interface 406. The device 400 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404 and the network interface 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to the flow diagram 300 of FIG. 3. In some embodiments, the function described herein is implemented using logic units, FPGAs, ASICs, DSPs, or any other suitable hardware or electronic circuitry.

The memory 404 is operable to store any of the information described above with respect to FIGS. 1-3 along with any other data, instructions, logic, rules, or code operable to implement the function(s) described herein when executed by processor 402. For example, the memory 404 may store the publicly available user data 112a,b, user transaction data 116a,b, voice recordings 118a,b, voiceprints 126a,b, user sounds 202, user knowledge 128a,b, authentication phrases 130a,b, authentication questions 106a,b, anticipated voiceprints 132a,b, response voiceprints 134a,b, and authentication results 136a,b. The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The network interface 406 is configured to enable wired and/or wireless communications. The network interface 406 is configured to communicate data between the device 400 and other network devices, systems, or domain(s). For example, the network interface 406 may comprise a WIFI interface, a local area network (LAN) interface, a wide area network (WAN) interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
    a database configured to store:
        voice recordings of users speaking, and
        one or both of public user data comprising publicly available information about the users, and user transaction data comprising information about transactions performed by the users;
    an authentication subsystem coupled to the database, the authentication subsystem comprising a processor configured to:
        receive a request for authentication of a user to access a secure server;
        determine, based on the stored voice recordings of the user speaking, a voiceprint for the user, the voiceprint comprising a frequency-based representation of speech by the user;
        determine, based on the voiceprint, a set of authentication phrases for the user;
        determine, based on one or both of the public user data and the user transaction data, user knowledge, the user knowledge comprising information about one or more topics about which the user has knowledge;
        generate, based on the set of authentication phrases and the user knowledge, an authentication question, wherein an anticipated answer to the authentication question is associated with the one or more topics about which the user has knowledge and is a first authenticated phrase of the determined set of authentication phrases;
        determine, based on the voiceprint of the user and the first authentication phrase, an anticipated voiceprint corresponding to an expected voiceprint for the user speaking the first authentication phrase;
        provide the authentication question to a device of the user;
        determine a response voiceprint associated with a recording of a response to the authentication question spoken by the user;
        in response to determining that the response voiceprint matches the anticipated voiceprint, grant the user access to the secure server; and
        in response to determining that the response voiceprint does not match the anticipated voiceprint, deny the user access to the secure server.

2. The system of claim 1, wherein the voice recordings of the users speaking comprise one or both of recordings of the users speaking during enrollment in a user authentication program and recordings of the users speaking during previous transactions.

3. The system of claim 1, the processor further configured to determine the set of authentication phrases by:
    determining, based on the voiceprint, a sound for each sound type spoken by the user;
    identifying, from the determined sounds, one or more candidate sounds, each candidate sound comprising frequency characteristics distinguishable from previous sounds from other users for the same sound type; and
    identifying the set of authentication phrases, wherein each authentication phrase of the set of authentication phrases comprises at least one of the candidate sounds.

4. The system of claim 1, wherein the transaction data comprises one or more of an amount of money transferred in user transactions, a location of the user transactions, and items associated with the user transactions.

5. The system of claim 1, wherein the topics about which the user has knowledge included in the user knowledge comprise one or more of an event about which the user posted using a social media profile, an amount of money transferred in a transaction by the user, knowledge of a location of the transaction by the user, and knowledge of an item associated with the transaction by the user.

6. The system of claim 1, wherein the recording of the response to the authentication question spoken by the user is recorded on a mobile device operated by the user.

7. The system of claim 1, the processor further configured to determine the anticipated voiceprint by:
   identifying the sound types included in the authentication phrase and an order in which the identified sound types are included in the authentication phrase; and
   generating an anticipated sound combination by combining sounds determined for each sound type in the determined order;
   performing frequency analysis of the anticipated sound combination; and
   determining the anticipated voiceprint based on the performed frequency analysis.

8. The system of claim 1, the processor further configured to determine the response voiceprint by:
   receiving the recording of the response to the authentication question spoken by the user;
   performing frequency analysis of the received recording; and
   determining the response voiceprint based on the performed frequency analysis.

9. A method comprising:
   receiving a request for authentication of a user to access a secure server;
   determining, based on stored voice recordings of the user speaking, a voiceprint for the user, the voiceprint comprising a frequency-based representation of speech by the user;
   determining, based on the voiceprint, a set of authentication phrases for the user;
   determining, based on one or both of public user data comprising publicly available information about the user and user transaction data comprising information about transactions previously performed by the user, user knowledge, the user knowledge comprising information about one or more topics about which the user has knowledge;
   generating, based on the set of authentication phrases and the user knowledge, an authentication question, wherein an anticipated answer to the authentication question is associated with the one or more topics about which the user has knowledge and is a first authenticated phrase of the determined set of authentication phrases;
   determining, based on the voiceprint of the user and the first authentication phrase, an anticipated voiceprint corresponding to an expected voiceprint for the user speaking the first authentication phrase;
   providing the authentication question to a device of the user;
   determining a response voiceprint associated with a recording of a response to the authentication question spoken by the user;
   in response to determining that the response voiceprint matches the anticipated voiceprint, granting the user access to the secure server; and
   in response to determining that the response voiceprint does not match the anticipated voiceprint, denying the user access to the secure server.

10. The method of claim 9, wherein the voice recordings of the user speaking comprise one or both of recordings of the user speaking during enrollment in a user authentication program and recordings of the user speaking during previous transactions.

11. The method of claim 9, further comprising determining the set of authentication phrases by:
    determining, based on the voiceprint, a sound for each sound type spoken by the user;
    identifying, from the determined sounds, one or more candidate sounds, each candidate sound comprising frequency characteristics distinguishable from previous sounds from other users for the same sound type; and
    identifying the set of authentication phrases, wherein each authentication phrase of the set of authentication phrases comprises at least one of the candidate sounds.

12. The method of claim 9, wherein the transaction data comprises one or more of an amount of money transferred in user transactions, a location of the user transactions, and items associated with the user transactions.

13. The method of claim 9, wherein the topics about which the user has knowledge included in the user knowledge comprise one or more of an event about which the user posted using a social media profile, an amount of money transferred in a transaction by the user, knowledge of a location of the transaction by the user, and knowledge of an item associated with the transaction by the user.

14. The method of claim 9, wherein the recording of the response to the authentication question spoken by the user is recorded on a mobile device operated by the user.

15. The method of claim 9, further comprising determining the anticipated voiceprint by:
    identifying the sound types included in the authentication phrase and an order in which the identified sound types are included in the authentication phrase; and
    generating an anticipated sound combination by combining sounds determined for each sound type in the determined order;
    performing frequency analysis of the anticipated sound combination; and
    determining the anticipated voiceprint based on the performed frequency analysis.

16. The method of claim 9, further comprising determining the response voiceprint by:
    receiving the recording of the response to the authentication question spoken by the user;
    performing frequency analysis of the received recording; and
    determining the response voiceprint based on the performed frequency analysis.

17. A device comprising:
    a memory configured to store:
       voice recordings of users speaking, and
       one or both of public user data comprising publicly available information about the users, and user transaction data comprising information about transactions performed by the users; and
    a processor coupled to the memory and configured to:
       receive a request for authentication of a user to access a secure server;
       determine, based on the stored voice recordings of the user speaking, a voiceprint for the user, the voiceprint comprising a frequency-based representation of speech by the user;

determine, based on the voiceprint, a set of authentication phrases for the user;

determine, based on one or both of the public user data and the user transaction data, user knowledge, the user knowledge comprising information about one or more topics about which the user has knowledge;

generate, based on the set of authentication phrases and the user knowledge, an authentication question, wherein an anticipated answer to the authentication question is associated with the one or more topics about which the user has knowledge and is a first authenticated phrase of the determined set of authentication phrases;

determine, based on the voiceprint of the user and the first authentication phrase, an anticipated voiceprint corresponding to an expected voiceprint for the user speaking the first authentication phrase;

provide the authentication question to a device of the user;

determine a response voiceprint associated with a recording of a response to the authentication question spoken by the user;

in response to determining that the response voiceprint matches the anticipated voiceprint, grant the user access to the secure server; and in response to determining that the response voiceprint does not match the anticipated voiceprint, deny the user access to the secure server.

18. The device of claim 17, the processor further configured to determine the set of authentication phrases by:

determining, based on the voiceprint, a sound for each sound type spoken by the user;

identifying, from the determined sounds, one or more candidate sounds, each candidate sound comprising frequency characteristics distinguishable from previous sounds from other users for the same sound type; and identifying the set of authentication phrases, wherein each authentication phrase of the set of authentication phrases comprises at least one of the candidate sounds.

19. The device of claim 17, the processor further configured to determine the anticipated voiceprint by:

identifying the sound types included in the authentication phrase and an order in which the identified sound types are included in the authentication phrase; and generating an anticipated sound combination by combining sounds determined for each sound type in the determined order;

performing frequency analysis of the anticipated sound combination; and determining the anticipated voiceprint based on the performed frequency analysis.

20. The device of claim 17, the processor further configured to determine the response voiceprint by:

receiving the recording of the response to the authentication question spoken by the user;

performing frequency analysis of the received recording; and determining the response voiceprint based on the performed frequency analysis.

\* \* \* \* \*